United States Patent [19]

Kawasaki

[11] 3,842,428
[45] Oct. 15, 1974

[54] CAMERA FLASH CONTROLS WITH INTERNAL LIGHT DETECTION

[75] Inventor: Masahiro Kawasaki, Tokyo, Japan

[73] Assignee: Asahi Kogaku Kogyo Kabushiki Kaisha, Tokyo-to, Japan

[22] Filed: Mar. 5, 1973

[21] Appl. No.: 337,872

[30] Foreign Application Priority Data
Mar. 8, 1972 Japan.............................. 47-23163

[52] U.S. Cl.................. 354/145, 354/33, 315/241 P
[51] Int. Cl. ........................................ H05b 41/00
[58] Field of Search........... 95/11 L, 11.5 R, 10 CE; 315/241 P; 250/214 P

[56] References Cited
UNITED STATES PATENTS

| | | | |
|---|---|---|---|
| 3,648,104 | 3/1972 | Ackermann | 95/11.5 X |
| 3,684,917 | 8/1972 | Uno et al. | 95/11.5 R X |
| 3,706,266 | 12/1972 | Uno et al. | 95/11 L |
| 3,709,123 | 1/1973 | Tokutomi | 95/10 CE X |

Primary Examiner—Robert P. Greiner
Attorney, Agent, or Firm—Steinberg & Blake

[57] ABSTRACT

A camera which operates with flash illumination. A flash structure is provided for creating first a preparatory flash illumination, prior to film exposure, and then a main flash illumination during film exposure. Control circuitry is electrically connected with the flash structure for determining the duration of preparatory flash illumination, and an electrical memory structure memorizes an electrical quantity which corresponds to the duration of preparatory flash illumination. Then during main flash illumination a main control structure controls the duration of the main flash illumination in accordance with the electrical quantity stored by the memory structure. Since this latter quantity is determined prior to film exposure, it is possible to measure light during the preparatory flash illumination with an internal photosensitive unit.

9 Claims, 4 Drawing Figures

CAMERA FLASH CONTROLS WITH INTERNAL LIGHT DETECTION

BACKGROUND OF THE INVENTION

The present invention relates to cameras.

In particular, the present invention relates to cameras which has flash structure for providing flash illumination, and especially such cameras which have internal photosensitive devices for measuring light after the light has travelled through the objective of the camera.

As is well known particularly with single lens reflex cameras, it is possible to measure the brightness of the light at the object to be photographed by detecting light which has already passed through the objective of the camera, this light being detected by a light-receiving element which is situated in the path of light within the camera itself. However, with such single lens reflex cameras it is necessary at the moment of film exposure either to withdraw the light-receiving element to a location where it will not interfere with the film exposure or, if the light-receiving element is situated in the path of light which travels through the viewfinder, then the light which is received by the light-receiving element is necessarily blocked and prevented from reaching the light-receiving element during exposure. As a result it is not possible with such cameras to carry out the light measurement during the time when film is exposed. These considerations apply not only to daylight exposures but also to exposures made with flash illumination. Thus, when additional artificial light is required to make an exposure, a source of flash illumination is provided to furnish the additional light which is required to achieve a proper exposure. This flash illumination is necessarily provided in synchronism with the opening of the shutter to expose the film, and thus under conditions of flash illumination it is also not possible to measure the light during film exposure.

SUMMARY OF THE INVENTION

It is accordingly a primary object of the present invention to provide structure which will avoid the above drawbacks.

In particular, it is an object of the present invention to provide a structure which will avoid the above drawbacks.

In particular, it is an object of the present invention to provide a structure which will enable proper exposures to be made with flash illumination even though the light-detecting element is used in a single lens reflex camera where the light is detected by this element only after the light already travelled through the objective of the camera.

Yet another object of the present invention is to provide a structure of the above type which is exceedingly simple and at the same time highly effective so as to be capable of achieving proper exposures in a highly precise manner.

According to the invention a camera is provided with a flash means for providing first preparatory flash illumination prior to film exposure and then main flash illumination during film exposure. A preparatory control means is operatively connected with the flash means for controlling the duration of the preparatory flash illumination. A memory means is operatively connected with this preparatory control means for retaining an electrical quantity which corresponds to the duration of the preparatory flash illumination. A main control means is operatively connected with the flash means and with the memory means for determining the duration of the main flash illumination at least in part in accordance with this electrical quantity which is memorized by the memory means. Thus, according to the invention, immediately before film exposure and, therefore, while the light from the object to be photographed can fall on the light-receiving element, a preparatory flash is carried out and light measurement is carried out during the period of the preparatory flash. Then, in accordance with the result of this latter light measurement, the flash amount during main flash illumination at the moment of actual film exposure is controlled.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
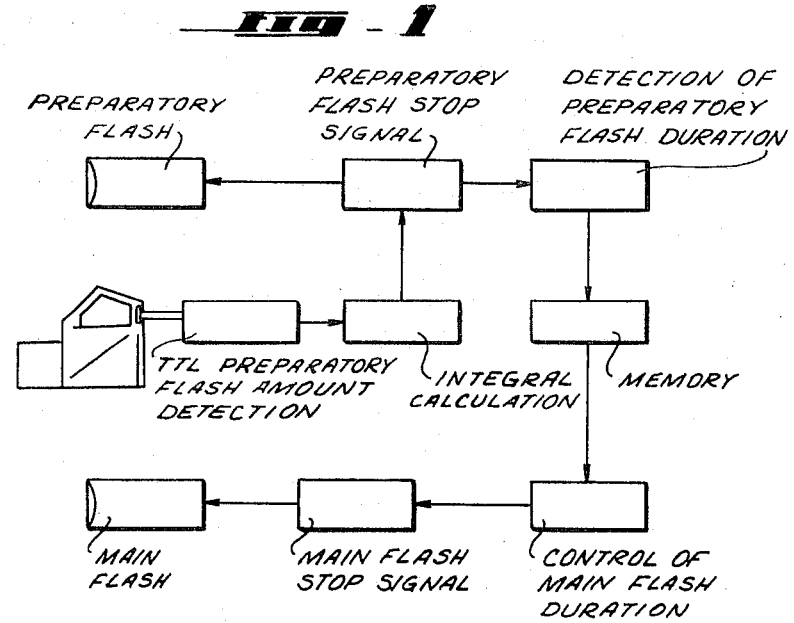
FIG. 1 is a block diagram schematically illustrating how the structure of the invention operates.

Referring now to the block diagram of FIG. 1, where the principle of the present invention is schematically represented, it will be understood that prior to film exposure a flash means provides a preparatory flash illumination, with the light created during the period of preparatory flash illumination being received by a photosensitive means within the camera which is shown schematically in FIG. 1 at the left thereof. The source of preparatory flash illumination is shown at the upper left of FIG. 1 while a source of main flash illumination is shown at the lower left of FIG. 1. The light-receiving element which measures the light during preparatory flash illumination is shown just to the right of the schematically illustrated camera, and in accordance with the light measurement, the received light information is processed by the integration section which performs the integral calculation as indicated in FIG. 1. In accordance with this integral calculation a flash stop signal for the preparatory flash is provided, and this signal is transmitted to the preparatory flash structure to terminate the preparatory flash illumination. At the same time an electrical quantity which corresponds to the duration of the preparatory flash illumination is detected, as shown by the block at the upper right of FIG. 1, and this electrical quantity is stored as designated by the central block at the right of FIG. 1. Thus, the duration of the preparatory flash illumination provides an amount of flash illumination which serves to control the main flash illumination so that during exposure the proper amount of light will be received in accordance with various conditions such as the selected setting of the diaphragm and the distance from the camera to the object which is photographed. Thus, this duration information resulting from the preparatory flash illumination is memorized and then the main flash illumination is carried out. After duration of a period of time which has a certain relationship with respect to the memorized signal, the main flash illumination is terminated. Thus as is shown at the lower part of FIG. 1, the stored memory signal is used to control the main flash duration and will provide a flash stop signal for the main flash. Thus, these controls are carried out in such a way that the main flash illumination is terminated by a stop signal indicating that a certain amount of light is received during the main flash illumination. This latter amount of light which is provided during main flash illumination will be determined in accordance with the speed of the film which is exposed so that with the main flash illumination there will be a proper exposure of film in the camera.

While the block diagram of FIG. 1 shows two separate sources of light for the preparatory flash and main flash, it is to be understood that this is only a schematic illustration and that in fact a single source of light may be used both for the preparatory flash and the main flash, and in fact a single flash may be used to provide both the preparatory flash and main flash with an initial part of a single continuous flash forming the preparatory flash and an immediately subsequent part thereof forming the main flash.

The proper exposure of film during main flash illumination in accordance with information provided by preparatory flash illumination may be considered mathematically as follows:

It is assumed that A (lumen.sec) is the proper flash amount in accordance with the speed of the film which is exposed, and $T_M$ (sec) is the duration of main flash illumination. Then:

$$A = \int_0^{TM} L_M(t)dt$$

where $L_M$ is the whole pencil of light rays of the main flash. The relation between the preparatory flash amount and the main flash amount is as follows:

$L_M(t) = \alpha L_S(t)$ where $L_S$ is the whole pencil of light rays of the preparatory flash and $\alpha$ is a proportion constant. The level of the proper value of light in connection with the amount of preparatory flash illumination is $A/\alpha$ (lumen.sec)

so that the amount of preparatory flash is $$A/\alpha = \int_0^{T_S} L_S(t)dt,$$

where $T_S$ is the duration of the preparatory flash illumination. Substituting quantities from the first equations presented above into the last, it will be seen that the following relationship is obtained:

$T_M = T_S$.

Thus, with this relationship $T_M = T_S$, the proper light exposure for the main flash is obtained.

Figure 2:
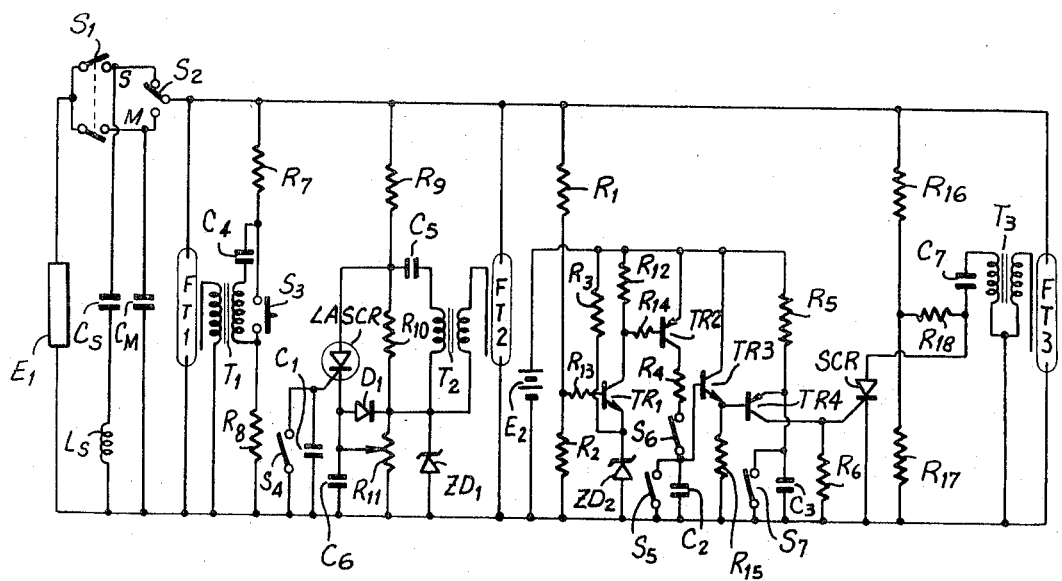
FIG. 2 is a wiring diagram of one possible embodiment of a structure according to the invention.

Referring now to FIG. 2, the circuitry illustrated therein conforms to the above principles. The circuitry shown in FIG. 2 includes two capacitors $C_S$ and $C_M$ connected through a common switch $S_1$ with a source $E_1$ of high d.c. voltage. The capacitor $C_S$ stores electrical energy which is consumed for preparatory flash illumination while the capacitor $C_M$ stores electrical energy consumed during main flash illumination. A changeover switch $S_2$ is provided for alternately connecting the cpaacitors $C_S$ and $C_M$ to a single source of flash illumination formed by the flash tube $FT_1$, so that this single flash tube is used both for preparatory flash illumination and main flash illumination. A preparatory flash terminating means is formed by the flash-stop tube $FT_2$ and a main flash terminating means is formed by a flash-stop tube $FT_3$, these latter tubes $FT_2$ and $FT_3$ both being electrically connected with the source of flash illumination $FT_1$ in the manner illustrated in FIG. 2. These flash stop tubes $FT_2$ and $FT_3$ respectively form parts of a preparatory control means and a main control means for respectively controlling the preparatory flash illumination and the main flash illumination, these two control means including also the circuitry which is illustrated in FIG. 2 and which is described in greater detail below.

The flash tube $FT_1$ is controlled by a trigger transformer $T_1$ and is triggered by the secondary side high voltage part of the transformed $T_1$ in a well known manner. One end of the primary coil of transformer $T_1$ is connected to one terminal of a trigger capacitor $C_4$, and the other terminal of capacitor $C_4$ is connected through a resistor $R_7$ to one of the terminals of the energy-storing capacitors $C_S$ and $C_M$. The other end of the primary coil of transformer $T_1$ is connected through a resistor $R_8$ to the other of the terminals of the capacitors $C_S$ and $C_M$. A normally open switch $S_3$ is inserted between the junctions which connect the capacitor $C_4$ to the resistor $R_7$ and the primary coil of of transformer $T_1$ to the resistor $R_8$.

This normally open switch $S_3$ is closed by the mechanism of the camera which controls the shutter thereof. Thus, for example, a mechanism which swings the mirror up to a position enabling the film to be exposed will operate prior to swinging up of the mirror to first close and then immediately thereafter open the switch $S_3$. Then, in synchronism with the next operation, that is the actual opening of the shutter to make an exposure, with the mirror swinging up at this time, the switch $S_3$ is again closed and opened.

The preparatory flash-terminating means $FT_2$ is triggered by the secondary high voltage side of a trigger transformer $T_2$, and the firing of the flash stop tube $FT_2$ bypasses the tube $FT_1$ with the capacitor $C_S$ discharging through the tube $FT_2$ as soon as the latter is triggered so that there is an instantaneous quenching of the flash illumination provided by the tube $FT_1$. Such bypass quenching systems for terminating flash illumination are well known. One end of the primary coil of transformer $T_2$ is connected in series with a trigger capacitor $C_5$, while the other end thereof is connected to one end of the secondary winding. The transformer $T_2$ and the capacitor $C_5$ are connected in parallel with a resistor $R_{10}$ which together with the resistors $R_9$ and $R_{11}$ forms a series of three series-connected resistors constituting a bleeder circuit with the capacitors $C_S$ and $C_M$ which serve as current sources. In parallel with the resistor $R_{10}$ is a photosensitive means which forms part of the preparatory control means and is constituted by a photosensitive silicon control element LASCR. A diode $D_1$ is connected in series with the resistor $R_{10}$ and the photosensitive means LASCR so as to form a loop circuit which contains the trigger capacitor $C_5$, the photosensitive means LASCR, the diode $D_1$ and the primary coil of the transformer $T_2$.

The gate current of the control element LASCR varies with the intensity of the light which is received during preparatory flash illumination, and this photosensitive means is turned "on", or in other words becomes conductive, when the gate voltage reaches a predetermined value. In series with the gate of photosensitive means LASCR is a capacitor $C_1$ for current integration. A normally closed switch $S_4$ is connected across the capacitor $C_1$ in parallel therwith. This switch $S_4$ is opened in synchromism with the creation of the preparatory flash illumination, and the gate current which corresponds to the brightness of the light received by the photosensitive means LASCR is integrated by the capacitor $C_1$. As a result, when the gate voltage reaches a predetermined value, the photosensitive means LASCR is turned on so that the trigger capacitor $C_5$ is discharged through the primary coil of the trigger transformer $T_2$.

A capacitor $C_6$ is inserted between the anode of diode $D_1$ and one of the terminals of the capacitors $C_S$ and $C_M$. THis capacitor $C_6$ cooperates with a voltage divider formed by the potentiometer $R_{11}$ in the form of a resistor having a sliding contact which can be adjusted along the resistor. Thus, the capacitor $C_6$ is connected so as to cooperate with the voltage dividing resistor $R_{11}$ and with a voltage regulator of Zener diode $ZD_2$ which is connected in parallel with the resistor $R_{11}$, so that through this circuitry it is possible to control the voltage with respect to the conducting poles of the photosensitive means LASCR.

The right part of FIG. 2 illustrates the main control means which is electrically connected with the flash means for determining the duration of main flash illumination. This part of the circuitry includes a low voltage source $E_2$ and a switching transistor $TR_1$ connected to the low voltage source by way of a collector resistor $R_{12}$. This circuit also includes a voltage adjusting resistor $R_3$ connected to the emitter circuit of transistor $TR_1$, with a voltage regulator or Zener diode $ZD_2$ also connected to the emitter of transistor $TR_1$. The base electrode of transistor $TR_1$ connected through a base resistor $R_{13}$ to an output terminal of a bleeder circuit with respect to the voltage across the output terminals of capacitor $C_S$, this bleeder circuit consisting of resistors $R_1$ and $R_2$. Thus, the transistor $TR_1$ becomes nonconductive when the voltage across the terminals of capacitor $C_S$ drops below a predetermined value.

The base electrode of a transistor $TR_2$ is connected through a resistor $R_{14}$ to the collector electrode of transistor $TR_1$. In the current control circuit of transistor $TR_2$ there is a series-connected capacitor $C_2$, which forms the memory means for retaining the electrical quantity determined during the preparatory flash illumination. Between the transistor $TR_2$ and the memory capacitor $C_2$ there is a series-connected resistor $R_4$ and a switch $S_6$. In parallel with the memory capacitor $C_2$ is a switch $S_5$ which bridges the capacitor $C_2$ in order to bypass the latter when the switch $S_5$ is closed.

During the time that the transistor $TR_2$ is conductive, the memory capacitor $C_2$ is charged with a current which passes through the resistor $R_4$, assuming that the switch $S_5$ is open, then when the switch $S_6$ is subsequently opened the charge at the memory capacitor $C_2$ will be retained thereby.

This retained voltage across the terminals of capacitor $C_2$ is applied between the base and emitter of a buffer transistor $TR_3$. The junction between the transistor $TR_3$ and its emitter resistor $R_{15}$ is connected to the base of the following stage switching transistor $TR_4$. The emitter electrode of the transistor $TR_4$ is connected to a junction between the series-connected resistor $R_5$ and a timing capacitor $C_3$. In parallel with the timing capacitor $C_3$ there is a switch $S_7$ which bridges the capacitor $C_3$. Thus, the switch $S_7$ forms a charge-discharge control circuit for the timing capacitor $C_3$.

When this switch $S_7$ is in an open position, a current under the control of the resistor $R_5$ flows into and charges the capacitor $C_3$. The voltages of the timing capacitor $C_3$ and the memory capacitor $C_2$ are compared with each other by way of the transistor $TR_4$ which becomes conductive when the voltage of timing capacitor $C_3$ becomes greater than the charge retained by the memory capacitor $C_2$.

The collector electrode of transistor $TR_4$ is connected to the gate electrode of a silicon control rectifier element SCR together with a bias resistor $R_6$. In a circuit which is controlled by the SCR there are a capacitor $C_7$ which is a low-current capacitor charged by a bleeder output of a bleeder circuit which includes the series-connected resistors $R_{16}$ and $R_{17}$, the capacitor $C_7$ being controlled through a resistor $R_{18}$ which is connected between the capacitor $C_7$ and a junction between the resistors $R_{16}$ and $R_{17}$. This circuit also includes the trigger transformer $T_3$ which is used to trigger the second flash-terminating means formed by the flash tube $FT_3$. The capacitor $C_7$ and the primary coil of the trigger transformer $T_3$ are connected in series to each other. The arrangement is such that the secondary high voltage pulse output of the trigger transformer $T_3$ fires the main flash stopping discharge tube $FT_3$.

The switches $S_5$, $S_6$ and $S_7$ are operated by way of a transmission which is operated when the camera is operated, as by movement of the shutter-tripping plunger by the operator. In synchronism with the creation of the preparatory flash illumination, the switch $S_5$ and also the switch $S_4$ are opened just prior to creation of the preparatory flash illumination. The switch $S_6$ is opened in synchronism with the change-over of the switch $S_2$ from the contact S to the contact M. In synchronism with creation of the main flash illumination, the switch $S_7$ is opened, actually just prior to creation of the main flash illumination.

The sequence of operation of the several switches $S_1$–$S_7$ will appear from the description which follows.

The switch $S_1$ is initially closed in order to charge the capacitors $C_S$ and $C_M$. Upon completion of the charge of these capacitors, the switch $S_1$ is opened. At this time the switch $S_2$ engages the contact S, as illustrated in FIG. 2. The normally open switch $S_3$ is now open, the normally closed switch $S_4$ is closed, and the normally closed switches $S_5$, $S_6$, and $S_7$ also are all closed.

In preparation for making an exposure with flash illumination, the switches $S_4$ and $S_5$ are opened and then the switch $S_3$ is closed. Just prior to making an exposure, the switch $S_6$ is opened and at the same time the switch $S_2$ is changed over to engage the M contact, and of course the switch $S_3$ is opened after being briefly closed in order to create the flash illumination. Thus, when the shutter is opened in order to expose film the switch $S_3$ is first closed and thereafter opened, and in synchronism with the opening of the shutter the switch $S_7$ is opened.

During the above-mentioned time sequence, the initial closure of the switch $S_3$ causes the preparatory flash illumination to be created, while the second closure of the switch $S_3$ causes the main flash illumination to be created. If the X-contact of the camera is situated in parallel with the switch $S_3$, then instead of providing creation of the main flash by closure of the switch $S_3$ this creation of the main flash can be created by closing of the X-contact in synchronism with opening of the shutter as is well known.

Figure 3:
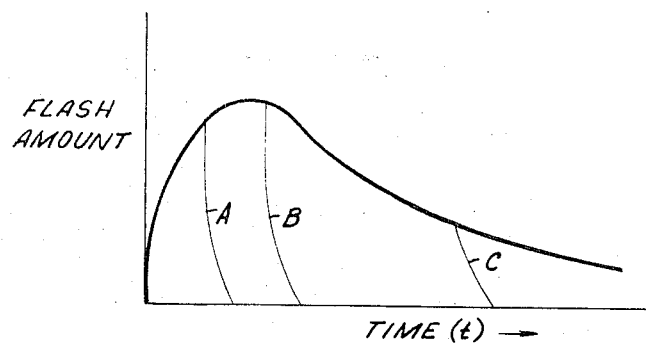
FIG. 3 is a graph illustrating the relationship between the amount of flash illumination and time.

Thus, with the above structure of the invention the preparatory flash illumination is provided at the initial closing of the switch $S_3$. The photosensitive means formed by the photo-silicon control element LASCR receives the light which is reflected from the object to be photographed, this light being provided by the preparatory flash illumination, and the amount of light received by the photosensitive means LASCR is integrated by the capacitor $C_1$. When an amount of light for providing a proper exposure is reached, the preparatory flash illumination is terminated by firing of the bypass or quenching tube $FT_2$ so that the firing of the tube $FT_2$ by the trigger transformer $T_2$ will permit whatever charge remains at the capacitor $C_S$ to discharge immediately through the tube $FT_2$, thus terminating operation of the flash means $FT_1$. In this way the preparatory flash illumination is terminated. The relation between the flash duration time $t$ and the amount of flash illumination is illustrated in FIG. 3. The curves A, B, C indicate different diaphragm settings.

Figure 4:
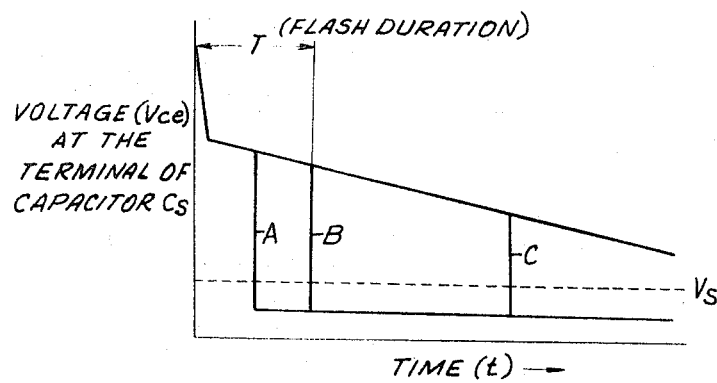
FIG. 4 is a graph illustrating the charge of a capacitor used during preparatory flash illumination, FIG. 4 illustrating how this charge varies with time.

The graph of FIG. 4 illustrates how the voltage across capacitor $C_S$ drops sharply when the flash illumination is terminated. Thus, with the different illustrated diaphragm settings A, B, C the voltage will drop sharply at the flash duration indicated in FIG. 4, the voltage at the ordinate of FIG. 4 being the voltage of the capacitor $C_S$.

Just prior to closing of the switch $S_3$, the voltage of the base of transistor $TR_1$ is $V_{B1} = V_{CS}R_2/(R_1 + R_2)$, where $V_{CS}$ is the voltage across the capacitor $C_S$ and $V_{B1}$ is the base voltage of the transistor $TR_1$. The emitter of the transistor $TR_1$ is at the voltage $V_{ZD}$ as a result of the operation of the Zener diode $ZD_2$.

By adjusting the resistance values of resistors $R_1$ and $R_2$ so that $V_{B1S} = V_{ZD} + V_{BE1}$, then when the voltage across the capacitor $C_S$ is over $V_S$, the transistors $TR_1$ and $TR_2$ are conductive. $V_{B1S}$ is the voltage $V_{B1}$ when the voltage across the capacitor $C_S$ is $V_S$, the latter being illustrated in the graph of FIG. 4.

When the switch $S_3$ is closed for the preparatory flash illumination and the switch $S_5$ is opened, the capacitor $C_2$ begins to be charged through the resistor $R_4$. This charging operation continues until the preparatory flash illumination is terminated owing to the firing of the quenching tube $FT_2$. This voltage is the flash duration memory voltage $V_{MEM}$:

$$V_{MEM} = E(1 - e^{\frac{T}{C_2 \cdot R_4}}) \qquad (I)$$

This voltage, which forms the electrical quantity which is retained or memorized by the memory means $C_2$, is applied to the base of the transistor $TR_4$ with the transistor $TR_3$ acting as a buffer.

$$V_{B4} = V_{MEM} - V_{BE3} \qquad \text{II.}$$

where $V_{B4}$ is the base voltage of transistor $TR_4$ and $V_{BE3}$ is the base-emitter voltage of the transistor $TR_3$.

During the duration of the main flash illumination, the emitter voltage of transistor $TR_4$ rises as follows:

$$V_{E4} = E(1 - e^{\frac{t}{C_3 \cdot R_5}}) \qquad (III)$$

until this emitter voltage of the transistor $TR_4$ reaches the value $V_{B4} + V_{BE4}$, when the main flash is terminated:

$$V_{E4} = V_{B4} + V_{BE4} \qquad \text{IV.}$$

where $V_{E4}$ is the emitter voltage of transistor $TR_4$ and $V_{BE4}$ is the base-emitter voltage of the transistor $TR_4$.

If it is now assumed that $V_{BE4} = V_{BE3}$, $C_2 = C_3$ and $R_4$ and $R_5$, then from the equation (IV), $$V_{E4} = V_{MEM}$$

$$E(1 - e^{\frac{T}{C_2 \cdot R_4}}) = E(1 - e^{\frac{t}{C_3 \cdot R_5}})$$

$$t = T.$$

Thus, the control is carried out in such a way that the preparatory flash duration equals the main flash duration.

Thus, with the present invention it is possible to correctly control the amount of main flash illumination by detecting the amount of preparatory flash illumination with an internal photosensitive means which receives the light created during the preparatory flash illumination.

While in the example set forth above and shown in FIG. 2 the voltage variation of the preparatory flash capacitor $C_S$ is utilized to detect the flash duration and to serve as the electrical quantity which is memorized by the memory means $C_2$, it is also possible to employ other factors for this purpose such as the flash stop signal of the photosensitive means formed by the photo-silicon control element LASCR or the current variation of the flash stop tube $FT_2$ which forms the flash-terminating means for terminating the preparatory flash illumination may also be used as a signal to determine the duration of the preparatory flash which forms the electrical quantity which is memorized. Furthermore, while for the timing of the main flash duration an RC integration circuit is utilized in the illustrated example, it is also possible to utilize for this purpose a resistance variation resulting from a response to light or it is possible to use a variation of a period of oscillation for the timing of the main flash duration.

What is claimed is:

1. In a camera, flash means for providing first preparatory flash illumination prior to film exposure and then main flash illumination during film exposure, preparatory control means operatively connected with said flash means for controlling the duration of preparatory flash illumination, timing circuit means including memory means operatively connected with said preparatory control means for detecting and storing an electrical quantity representing the time duration of the preparatory flash illumination, and main control means operatively connected with said flash means and with said timing circuit means for determining the duration of main flash illumination at least in part in accordance with said electrical quantity.

2. The combination of claim 1 and wherein the camera has an objective, said preparatory control means including a photosensitive means for receiving light during preparatory flash illumination after the received light has travelled through the objective of the camera.

3. The combination of claim 2 and wherein said preparatory and main control means respectively include a preparatory flash-terminating means and a main flash-terminating means both of which are operatively connected with said flash means to terminate the operation thereof after the preparatory flash illumination and after the main flash illumination, respectively, so that the flash illumination is interrupted between the preparatory flash illumination and the main flash illumination.

4. The combination of claim 3 and wherein said flash means includes a single source of flash illumination electrically connected with both of said flash-terminating means.

5. The combination of claim 2 and wherein said flash means includes a source of flash illumination and said preparatory control means includes a capacitor electrically connected with said source of flash illumination to supply thereto the energy consumed during preparatory flash illumination, so that said capacitor of said preparatory control means discharges during preparatory flash illumination, and said electrical quantity being determined by the length of time during which said capacitor supplies energy to said source of flash illumination.

6. The combination of claim 2 and wherein said memory is in the form of a memory capacitor for storing a charge corresponding to the time duration of the preparatory flash illumination, said timing circuit means including a time capacitor for retaining a second electrical quantity and a comparing circuit means for comparing said second electrical quantity with said stored electrical quantity to determine the duration of main flash illumination.

7. The combination of claim 6 and wherein said comparing circuit means is electrically connected with said timing capacitor and said memory capacitor for comparing the charge of the timing capacitor with the memory capacitor to determine the duration of main flash illumination.

8. The combination of claim 7 and wherein said comparing circuit means includes a transistor circuit electrically connected with said timing capacitor and memory capacitor.

9. The combination of claim 2 and wherein said preparatory control means provides for the preparatory flash illumination operating conditions equivalent to those provided by the main control means during main flash illumination, so that the duration of main flash illumination will equal the duration of preparatory flash illumination.

* * * * *